United States Patent
Zhang et al.

(10) Patent No.: US 12,050,792 B2
(45) Date of Patent: Jul. 30, 2024

(54) OPTIMIZING MEMORY TO STORAGE CAPACITY DIVISION ON A DC PERSISTENT MEMORY MODULE (DCPMM) IN MIXED MODE

(71) Applicant: Dell Products L.P., Round Rock, TX (US)

(72) Inventors: Zheng Zhang, Shanghai (CN); Wenwei Tang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/561,343

(22) Filed: Dec. 23, 2021

(65) Prior Publication Data

US 2023/0195335 A1 Jun. 22, 2023

(30) Foreign Application Priority Data

Dec. 16, 2021 (CN) .......................... 202111545785.7

(51) Int. Cl.
*G06F 3/06* (2006.01)
(52) U.S. Cl.
CPC .......... *G06F 3/0631* (2013.01); *G06F 3/0604* (2013.01); *G06F 3/068* (2013.01)
(58) Field of Classification Search
CPC ...... G06F 3/0631; G06F 3/0604; G06F 3/068; G06F 3/0629; G06F 3/0649; G06F 3/0685; G06F 3/0608; G06F 9/5016

USPC ......................................................... 711/127
See application file for complete search history.

(56) References Cited

U.S. PATENT DOCUMENTS

2020/0293444 A1* 9/2020 Jain ....................... G06F 3/0679
2020/0319989 A1* 10/2020 Marndi ............... G06F 11/3433
2022/0269434 A1* 8/2022 Shin ..................... G06F 3/0683

* cited by examiner

*Primary Examiner* — Hua J Song
(74) *Attorney, Agent, or Firm* — Jackson Walker L.L.P.

(57) ABSTRACT

Disclosed systems and methods include a CPU coupled to one or more storage resources including a hybrid storage resource that is user-configurable during boot to allocate some, all, or none of its capacity as a conventional dual in-line memory module (DIMM) and some, all, or none of its capacity as a persistent storage resource. A utilization efficiency index (UEI) of the hybrid storage resource is assessed. The UEI may be determined based on a combination of memory resource utilization, a persistent storage resource utilization, and weighting parameters that reflect a comparative utility or value of memory vs storage resources. A target division between memory and storage resources may then be determined based on the UEI assessment. The hybrid storage resource may then be configured by dividing or allocating a first portion of its capacity to the volatile memory resource and a remaining portion of its capacity to the persistent storage resource.

18 Claims, 5 Drawing Sheets

$$Index_{ue} = \frac{[(1-U_m) * W_{Um}] + [(1-U_s) * W_{Us}]}{W_{Um} + W_{Us}}$$

701  $S_{t+1} = \alpha y_t + (1 - \alpha) S_{t-1}$ where
$0 < \alpha \leq 1, t > 0$
$S_{t+1}$ -> predicted UEI for next times series interval (n+1)
$y_t$ -> observed UEI for current times series interval (n)
$S_{t-1}$ -> UEI predicted for prior time series interval (n-1)
$\alpha$ -> smoothing factor percentage

OPTIMIZING MEMORY TO STORAGE CAPACITY DIVISION ON A DC PERSISTENT MEMORY MODULE (DCPMM) IN MIXED MODE

TECHNICAL FIELD

The present disclosure relates to information handling system management and, more particularly, management and configuration of memory and storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

DC persistent memory (DCPMM) is an emerging technology in which non-volatile media is fabricated within a dual in-line memory module (DIMM) and installed on the memory bus alongside traditional dynamic random access memory (DRAM) DIMMs. The key thing that differentiates persistent memory DIMMs from DRAM DIMMs is that the data stored on them can be retained when the system is shut down or loses power. This allows them to be used as a form of permanent storage like Hard Disk Drives (HDDs) or Solid-State Drives (SSDs), but with memory-like latencies.

A DCPMM can be configured for use in different modes including a memory mode, in which the DCPMM acts as volatile system memory under the control of the operating system, an application direct mode, in which the DCPMM and the DRAM DIMMs act as independent memory resources under direct load/store control of the application, and a mixed mode in which a percentage of the DCPMM capacity is configured in memory mode and the remainder is configured in application direct mode.

An optimal DCPMM capacity configuration would avoid waste of either memory or persistent storage resources. The optimal configuration, however, is application dependent and dynamic.

SUMMARY

In accordance with systems and methods disclosed herein, common problems associated with dividing storage and memory resources in a configurable, hybrid storage resource are addressed. In one aspect, a disclosed information handling system includes one or more central processing units and storage resources communicatively coupled to the one or more CPUs. The hybrid storage resource is user-configurable during boot to allocate some, all, or none of its capacity as a conventional dual in-line memory module (DIMM) and some, all, or none of its capacity as a persistent storage resource.

The storage resources include CPU-executable program instructions, that, when executed by the one or more CPUs cause the information handling system to perform memory management operations that include assessing a utilization efficiency index (UEI) of the hybrid storage resource. The UEI is determined, at least in part, by a combination of a utilization of the volatile memory resource and a utilization of the persistent storage resource. A desired target memory to storage ratio is then determined for purposes of allocating based at least in part on the UEI assessment. The hybrid storage resource may then be configured to divide or allocate a first portion of its capacity to the volatile memory resource and a remaining portion of its capacity to the persistent storage resource. The first portion may be determined in accordance with the target memory-storage configuration.

Assessing the UEI may include obtaining times series samples of memory utilization and storage utilization and calculating the UEI for each sample based, at least in part, on the memory utilization and the storage utilization. In at least one embodiment, calculating the UEI includes accessing a memory weighting factor and a storage weighting factor. The weighting factors may reflect a comparative prioritization between memory utilization and storage utilization. For example, if memory utilization is considered to be a significantly higher priority than storage utilization, the memory weighting factor may be significantly higher than the storage weighting factor. The UEI value at any time may be calculated in accordance with one or more formulas set forth in the detailed description below.

The information handling system may be implemented within a comparatively stable and predictable environment such as a single tenant or on-premises environments. In these environments, determining a desired or target division of memory and storage resources may include identifying one or more system profiles, determining and assigning a static memory-storage division configuration to each profile based at least in part on a UEI determined for each profile. Each of system profile may be associated with a corresponding profile parameter such as a time-day parameter indicative of time-of-day and day-of-week information, an application parameter indicative of one or more applications, micro-services, or the like currently executing.

In other embodiments, including embodiments in which the information handling system is implemented in dynamic environment such as a multi-tenant cloud environment, assessing the UEI may include predicting a UEI for a next time series interval using, as an example, exponential smoothing. In these embodiments, assessing the UEI may include generating a smoothed time series of UEI values. The time series may be smoothed by taking comparatively frequently, e.g., hourly, instantaneous UEI values, and determining a mean of the instantaneous values over a longer interval, e.g., daily.

The information handling system may feature an HCI architecture that includes one or more resource clusters each of which includes one or more resource nodes. In these embodiments, instantaneous memory utilization samples may be collected across two or more nodes within a cluster or across two or more clusters for additional smoothing.

In one embodiment, the exponential smoothing performed comprises single exponential smoothing in which a predicted UEI for the next time series interval ($S_{t+1}$), is determined based on a current UEI ($y_t$), a previous value of the UEI ($S_{t-1}$), and $\alpha$ comprises a smoothing factor.

The smoothed time series of values may be classified into one of a plurality of types selected from the group of types comprising: a stable and flat time series, wherein an initial value of $\alpha$ is within a first range, a long-term up or down time series, wherein an initial value of a is within a second range, and a short term up and down pattern, wherein an initial value of $\alpha$ is in a third range. In these embodiments, the values in the third range may exceed the values in the second range and the values in the second range may exceed the values in the first range. The first range, as an illustrative example, may be the range from 0.1 to 0.3, the second range may be the range from 0.3 to 0.5, and the third range may be the range from 0.6 to 0.8. In some embodiments, a standard deviation of the smoothed time series of UEI value may be determined and the smoothing factor, $\alpha$, may be adjusted in accordance with a magnitude of the standard deviation. Higher standard deviations indicate sharper fluctuation of UEI, in which case a larger value of the smoothing factor, $\alpha$, may be employed. In contrast, smaller standard deviations of UEI indicate a flatter, less dynamic patter, suggesting that smaller values of the smoothing factor, $\alpha$, may be appropriate.

Some embodiments employ a two-phase approach to the management of memory storage division in DCPMM devices. In these embodiments, during a training phase exponential smoothing is performed with a high value of $\alpha$, e.g., greater than 0.5, to quickly adopt the predictions to the pattern. During the training phase, the DCPMM configuration is not altered during any server downtime windows. After sufficient training, an optimization phase is performed to predict UEI values the next time series interval. During the optimization phase, a standard deviation is determined and used to determine or influence the smoothing factor $\alpha$. During the optimization phase, the predicted value of UEI for the next times series interval is used to configure the DCPMM with a targeted allocation of memory resources vs storage resources. Some embodiments may perform an additional assurance by configuring two or other derivative configurations based on the targeted example. For example, a memory constrained derivate configuration may refer to a configuration in which the memory allocation is reduced to 50% of the targeted allocation. Similarly a storage constrained derivative configuration may refer to a configuration in which the storage allocation is 50% of the targeted configuration. UEI values are then determined for the targeted configuration and the derivate configurations. The configuration that results in the highest UEI may then be selected for implementation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
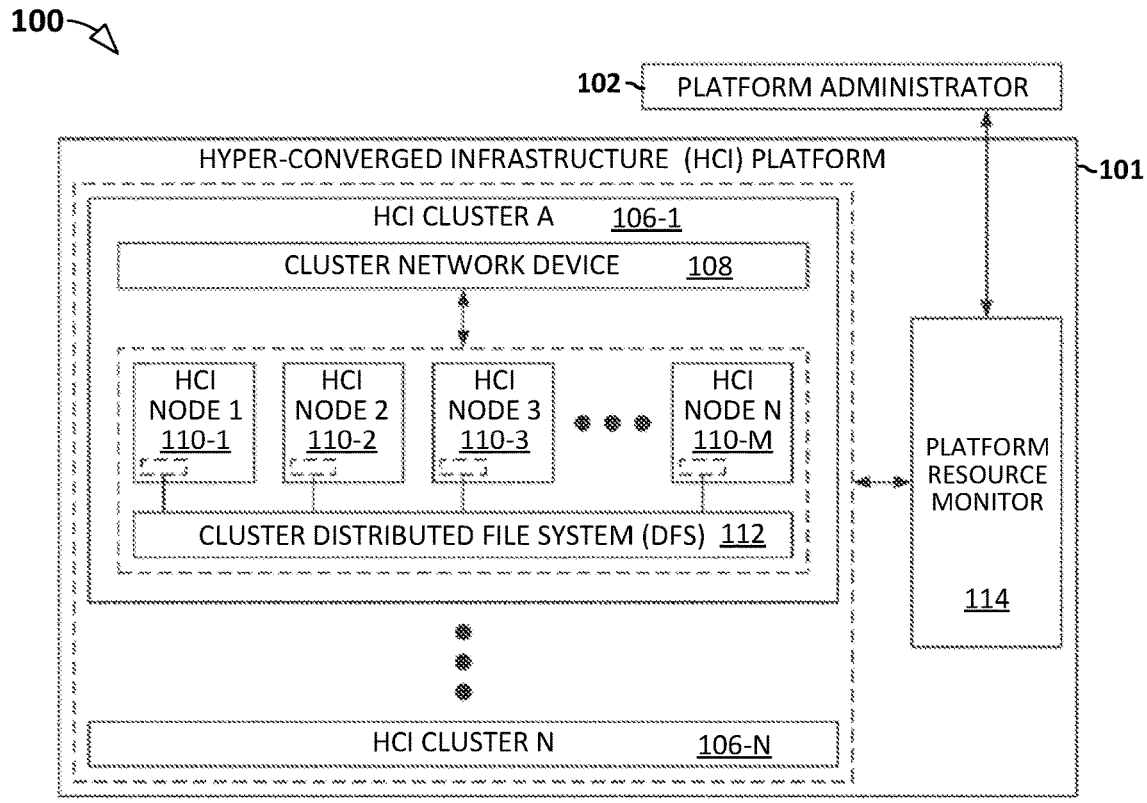
FIG. 1 illustrates a block diagram of an HCI platform.

Exemplary embodiments and their advantages are best understood by reference to FIGS. 1-8, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 2:
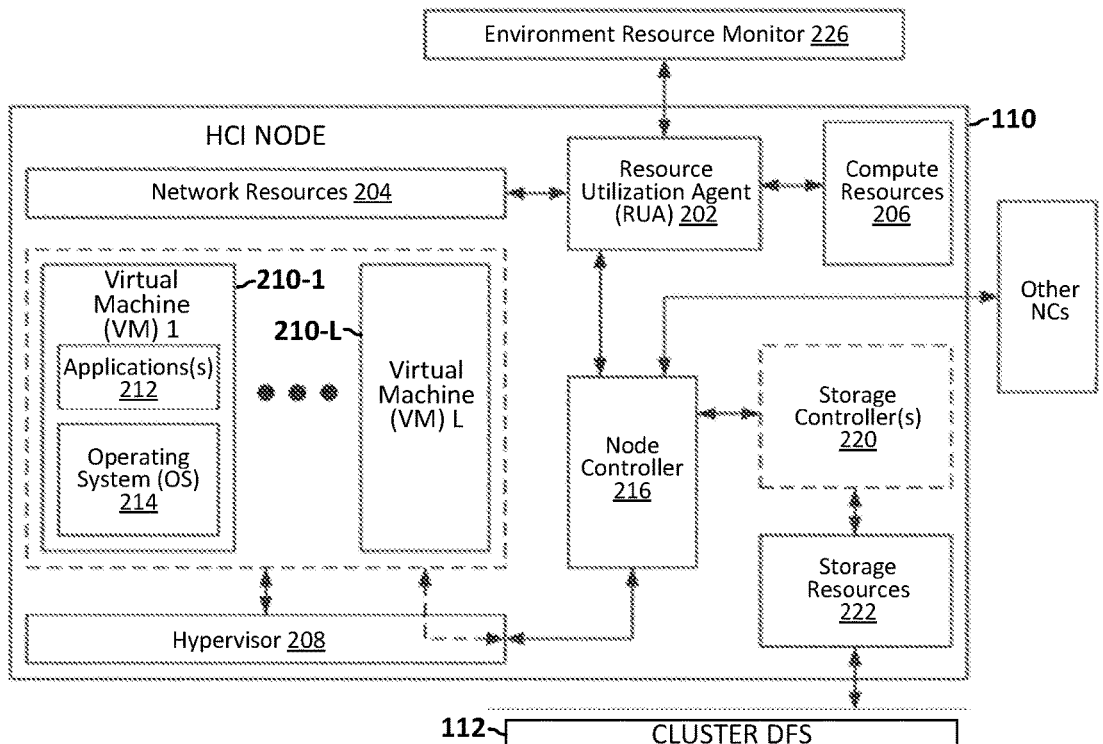
FIG. 2 illustrates a block diagram of an HCI node.

Before describing disclosed features for optimizing memory storage capacity division in a distributed computing environment, an exemplary HCI platform suitable for implementing disclosed features is provided. Referring now to the drawings, FIG. 1 and FIG. 2 illustrate an exemplary information handling system 100. The information handling system 100 illustrated in FIG. 1 and FIG. 2 includes a platform 101 communicatively coupled to a platform administrator 102. The platform 101 illustrated in FIG. 1 is an HCI platform in which compute, storage, and networking resources are virtualized to provide a software defined information technology (IT) infrastructure. Administrator 102 may be any computing system with functionality for overseeing operations and maintenance pertinent to the hardware, software, and/or firmware elements of HCI platform 101. Platform administrator 102 may interact with HCI platform 101 via requests to and responses from an application programming interface (API) (not explicitly depicted). In such embodiments, the requests may pertain to event messaging monitoring and event messaging state management described below. The HCI platform 101 illustrated in FIG. 1 may be implemented as or within a data center and/or a cloud computing resource featuring software-defined integration and virtualization of various information handling resources including, without limitation, servers, storage, networking resources, management resources, etc.

The HCI platform 101 illustrated in FIG. 1 includes one or more HCI clusters 106-1 through 106-N communicatively coupled to one another and to a platform resource monitor (PRM) 114. Each HCI cluster 106 illustrated in FIG. 1 encompasses a group of HCI nodes 110-1 through 110-M configured to share information handling resources. In some embodiments, resource sharing may entail virtualizing a resource in each HCI node 110 to create a logical pool of that resource, which, subsequently, may be provisioned, as needed, across all HCI nodes 110 in HCI cluster 106. For example, when considering storage resources, the physical device(s) (e.g., hard disk drives (HDDs), solid state drives (SSDs), etc.) representative of the local storage resources on each HCI node 110 may be virtualized to form a cluster distributed file system (DFS) 112. In at least some such embodiments, cluster DFS 112 corresponds to a logical pool of storage capacity formed from some or all storage within an HCI cluster 106.

An HCI cluster 106, and the one or more HCI nodes 110 within the cluster, may represent or correspond to an entire application or to one or more of a plurality of micro services that implement the application. As an example, an HCI cluster 106 may be dedicated to a specific micro service in which multiple HCI nodes 110 provide redundancy and support high availability. In another example, the HCI nodes 110 within HCI cluster 106 include one or more nodes corresponding to each micro service associated with a particular application.

The HCI cluster 106-1 illustrated in FIG. 1 further includes a cluster network device (CND) 108, which facilitates communications and/or information exchange between the HCI nodes 110 of HCI cluster 106-1 and other clusters 106, PRM 114, and/or one or more external entities including, as an example, platform the administrator 102. In at least some embodiments, CND 108 is implemented as a physical device, examples of which include, but are not limited to, a network switch, a network router, a network gateway, a network bridge, or any combination thereof.

PRM 114 may be implemented with one or more servers, each of which may correspond to a physical server in a data center, a cloud-based virtual server, or a combination thereof. PRM 114 may be communicatively coupled to all HCI nodes 110 across all HCI clusters 106 in HCI platform 101 and to platform administrator 102. PRM 114 may include a resource utilization monitoring (RUM) service or feature with functionality to monitor resource utilization parameters (RUPs) associated with HCI platform 101.

FIG. 2 illustrates an exemplary HCI node 110 in accordance with disclosed subject matter. HCI node 110, which may be implemented with a physical appliance, e.g., a server (not shown), implements hyper-convergent architecture, offering the integration of virtualization, compute, storage, and networking resources into a single solution. HCI node 110 may include a resource utilization agent(RUA) 202 communicatively coupled to network resources 204, compute resources 206, and a node controller 216. The node controller 216 illustrated in FIG. 2 is coupled to a hypervisor 208 that supports one or more virtual machines (VMs) 210-1 through 210-L), each of which is illustrated with an operating system (OS) 214 and one or more application program(s) 212. The illustrated node controller 216 is further coupled to storage components including zero or more optional storage controllers 220, for example, a small computer system interface (SCSI) controller, and storage components 222.

In some embodiments, RUA 202 is tasked with monitoring the utilization of virtualization, compute, storage, and/or network resources on HCI node 110. Thus, the node RUA 202 may include functionality to: monitor the utilization of: network resources 204 to obtain network resource utilization parameters (RUPs), compute resources 206 to obtain compute RUPs, virtual machines 210 to obtain virtualization RUPs, storage resources 222 to obtain storage RUPs. RUA 202 may provide some or all RUPs to environment resource monitor (ERM) 226 periodically through pull and/or push mechanisms.

Figure 3:
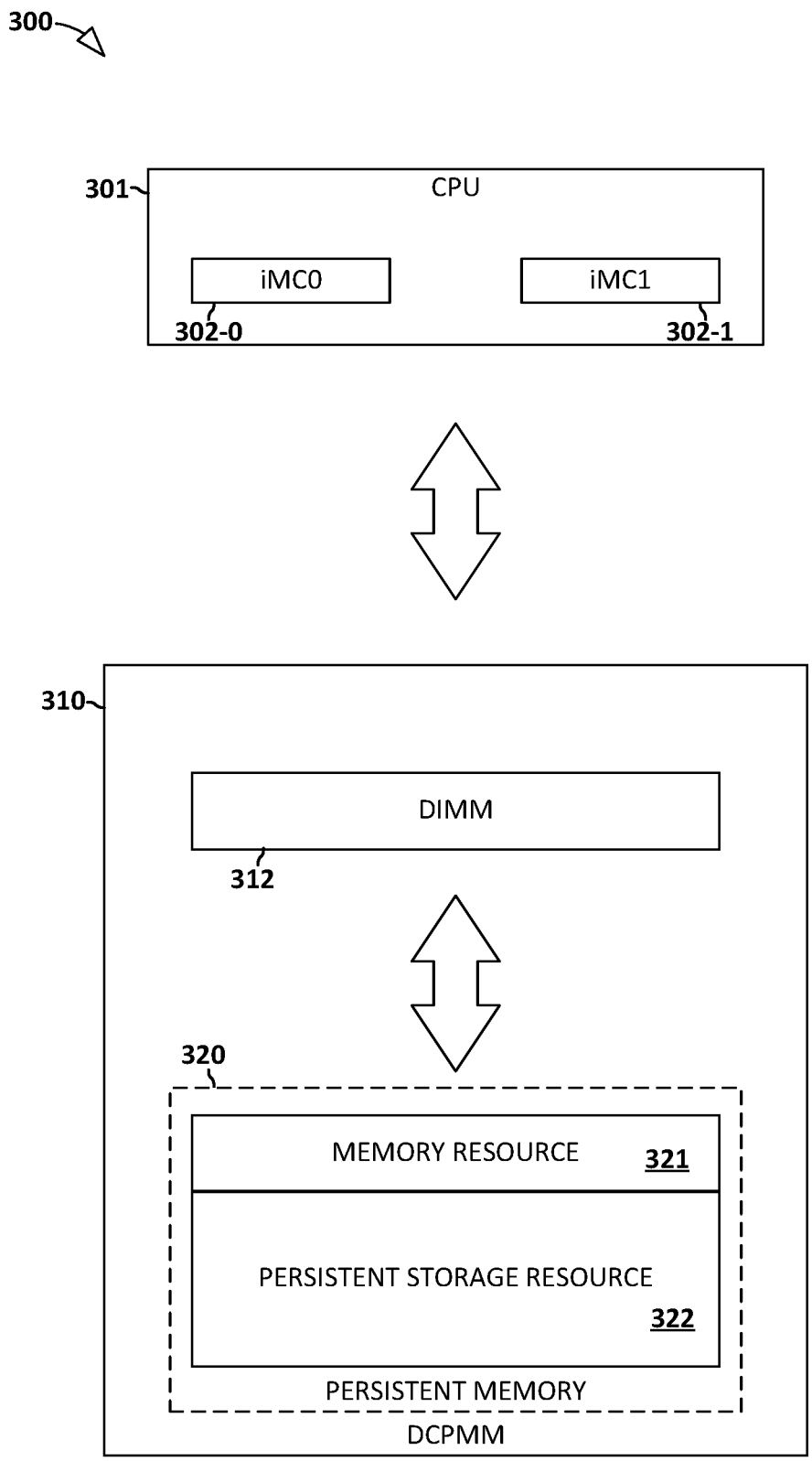
FIG. 3 illustrates a block diagram of a DCPMM.

Turning now to the optimization of memory-storage capacity division in a DCPMM or another suitable configuration, hybrid memory device, FIG. 3 illustrates an exemplary configurable, hybrid storage resource suitable for use in disclosed features for optimizing allocation efficiency.

Turning now to FIG. 3, an information handling system including a configurable, hybrid storage resource suitable for use in conjunction with disclosed methods for dividing memory and storage capacity is depicted. The information handling system 300 illustrated in FIG. 3 includes a CPU 301 coupled to configurable, hybrid storage resource in the form of a DCPMM 310. Although the illustrated implementation employs DCPMM 310 as the configurable, hybrid storage resource, other implementations may employ other types of hybrid resource.

The illustrated DCPMM 310 is implemented with persistent media 320 placed integrated with a dual in-line memory module (DIMM) 312 and installed on a memory bus (not explicitly depicted) accessible to CPU 301 via either of a pair of integrated memory controllers iMC0 (302-0) and iMC1 (302-1). In this configuration, the persistent memory DIMM may exist alongside traditional volatile memory DRAM DIMMs (not depicted). Those of ordinary skill in the field of memory and storage technology will recognize that persistent memory DIMMs provide persistent data, which may be retained following an intentional or unintended shut down or loss of power. The data persistence of DCPMM 310 enables use of DCPMM as a form of permanent storage like a hard disk drive or a solid state drive, but with memory-like latencies.

In at least some embodiments, DCPMM 310 can be configured for use in different modes including a memory mode, an application direct mode, and a mixed mode, also sometimes referred to as a concurrent mode with memory mode and app direct modes. In memory mode, DCPMM 310 may behave similar to conventional volatile system memory under the control of the operating system. In application direct mode DCPMM 310 and DRAM DIMMs may appear as independent memory sources under direct load/store control of an application program. This enables DCPMM capacity to be used as byte-addressable persistent memory that is mapped onto the system physical address space and directly accessible by applications.

The DCPMM 310 of FIG. 3 is illustrated configured in mixed mode with a portion of the persistent memory capacity functioning as a volatile memory resource 321 and the remainder of the persistent memory capacity functioning as a persistent storage resource 322. In mixed mode operation, the optimal division between memory and persistent storage is dynamic and application-dependent. Features and methods disclosed herein provide a method to determine and implement a suitable or optimal memory-storage division.

Figures 4, 5:
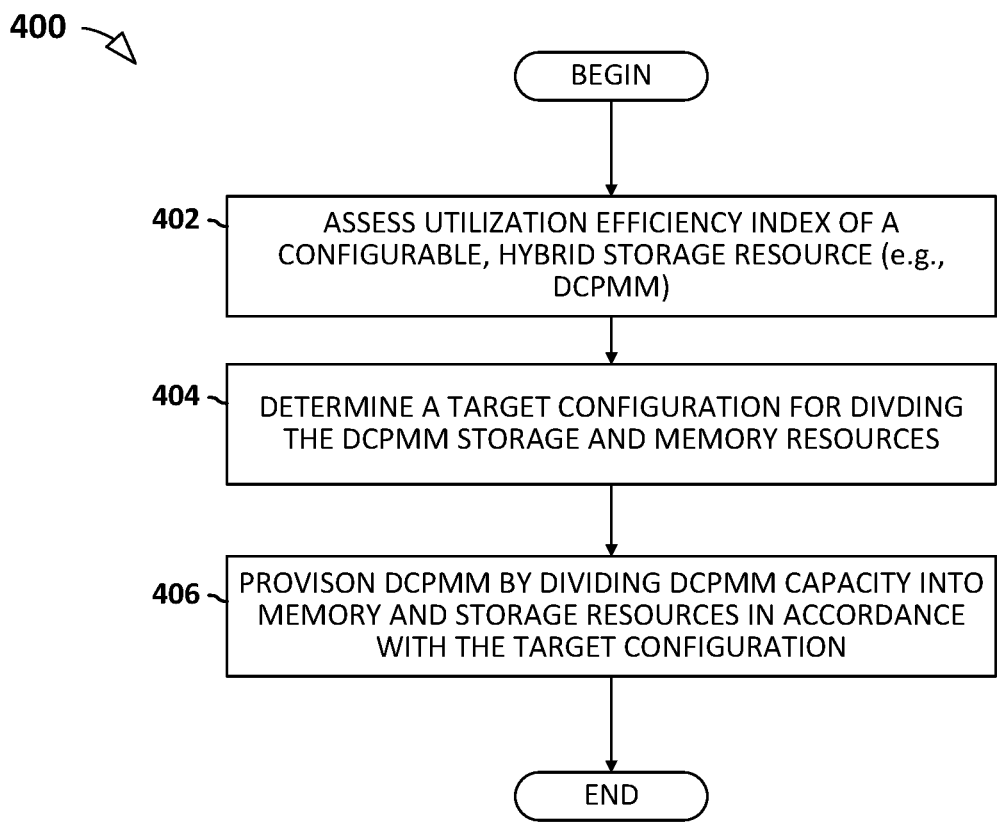
FIG. 4 illustrates a flow diagram of a method for managing a memory-storage configuration of a DCPMM.
FIG. 5 illustrates an algorithm for calculating a utilization efficiency index for the DCPMM.

Turning now to FIG. 4, a flow diagram illustrates a method 400 for selecting a desired percentage for dividing a DCPMM or another suitable type of configurable, hybrid storage resource between memory and persistent storage. The method 400 illustrated in FIG. 4 includes assessing (operation 402) a UEI of the DCPMM. The UEI may be determined based upon a memory utilization, a storage utilization, and one or more weighting factors that may reflect an intended and/or desirable prioritization between memory utilization and storage utilization. In at least one embodiment, the UEI may be defined in accordance with a formula 501 illustrated in FIG. 5. The UEI formula 501 illustrated in FIG. 5 is not exhaustive of all embodiments and other embodiments may implement variations of the illustrated formula.

Returning now to FIG. 4, the illustrated method 400 determines (operation 404) a target configuration for dividing DCPMM storage and memory resources. In at least one embodiment, the target configuration may be determined directly from the UEI obtained in operation 402. After determining a target configuration, the illustrated method 400 then provisions (operation 406) the DCPMM by storing a value determined from the UEI and stored on the DCPMM. During the next reboot, the stored value may be read by a BIOS or another suitable resource and used to divide the DCPMM capacity between memory and persistent storage in accordance with the stored value. As an illustrative example, if the target configuration is 40% memory and 60% persistent storage, operation 406 would configure the DCPMM with these percentages.

In some embodiments, including embodiments in which the operational state of the system is relatively stable, the determination of a target configuration for dividing the DCPMM storage between memory and persistent storage may be implemented using a comparatively small, e.g., three or four, set of static and/or pre-determined DCPMM configuration profiles. These embodiments might be suitable for a single-tenant environment, an on-premises cloud implementation, or any other environment in which the UEI is relatively stable and/or predictable. In at least one such embodiment, three predetermined DCPMM configuration profiles are employed wherein the first profile may be selected based upon the UEI determined in operation 402. For example, the configuration that achieves the highest UEI may be selected as the first DCPMM configuration profile.

Based on the first DCPMM configuration profile, a second profile, sometimes referred to herein as a memory-constrained profile, and a third profile, sometimes referred to herein as the storage-constrained profile may be derived from the first profile. To illustrate by way of example, if the first DCPMM configuration profile is 40% memory and 60% storage, the memory-constrained profile may be determined by using a memory allocation that is 50% of the memory allocation of first profile while the storage-constrained configuration may be implemented by using a storage allocation that is 50% of the first profile.

Continuing with the previously referenced example, the memory-constrained profile would have a memory allocation of 20% and a storage allocation of 80%, while the storage-constrained configuration would have a storage allocation of 30% and a memory allocation of 70%. With these three profiles defined, the system may then selected from among the three defined profiles depending on various factors. In at least one embodiment, UEI values may be sampled for each of the three pre-defined configurations and the configuration associated with the highest UEI may be selected for use following the next reboot.

Figures 6, 7:
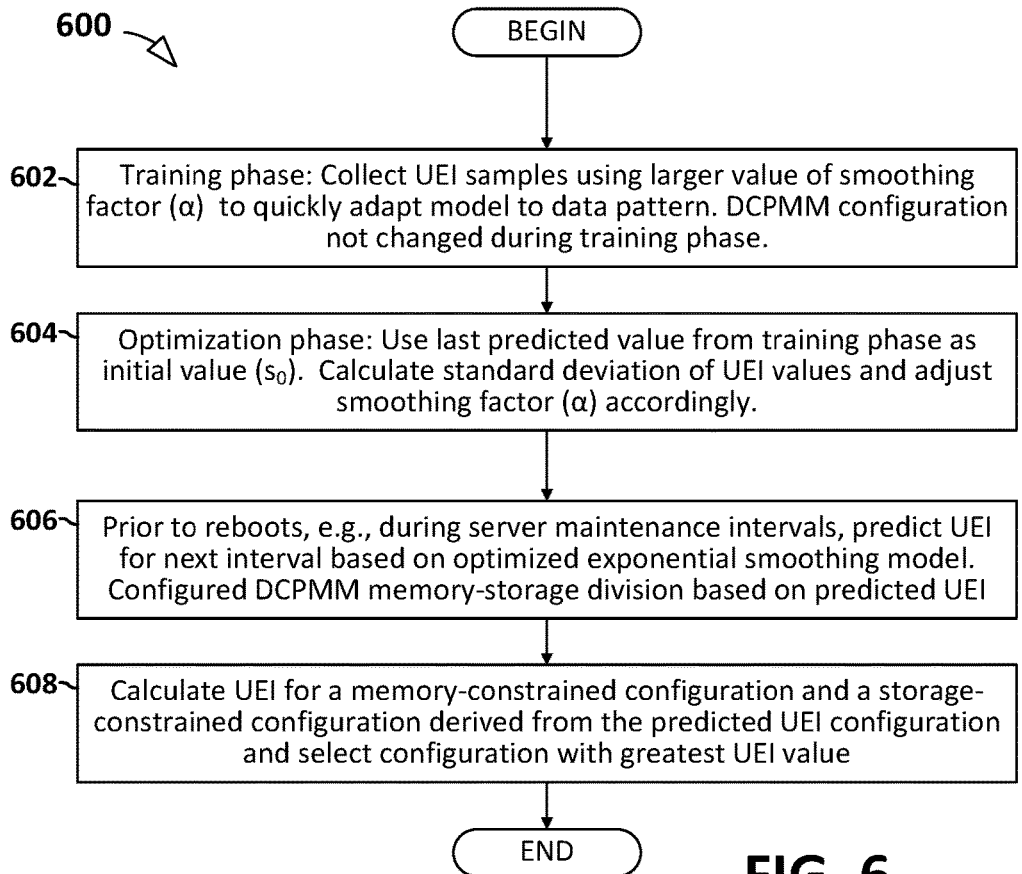
FIG. 6 illustrates a flow diagram of a second method for managing a memory-storage configuration of a DCPMM.
FIG. 7 illustrates an exponential smoothing algorithm for predicting a utilization efficiency index for the DCPMM.

Turning to FIG. 6 and FIG. 7, a method 600 (FIG. 6) for managing DCPMM memory-storage capacity division based on an exponential smoothing algorithm 700 (FIG. 7) for predicting future values of UEI is illustrated. The method 600 illustrated in FIG. 6 may be suitable for multi-tenant environments and other environments, in which the target configuration may be dynamic.

The method 600 illustrated in FIG. 6 employs exponential smoothing to determine or predict a next UEI value. FIG. 7 illustrates an exemplary exponential smoothing algorithm 700 which may be used in conjunction with method 600. Although the exponential smoothing algorithm 700 depicted in FIG. 7 is an example of a single exponential smoothing algorithm, other embodiments may employ more complex exponential smoothing algorithms including, without limitation, double exponential smoothing algorithms, triple exponential smoothing algorithms, and so forth.

Because exponential smoothing algorithms tend to produce more accurate predictions when the data samples exhibit few sudden spikes and sharp changes, embodiments of method 600 may include a data smoothing operation (not explicitly depicted in FIG. 6) to obtain a smoothed time series of UEI values. The smoothed time series of UEI values may be obtained by collecting UEI sample values at a relatively frequent interval, for example, hourly or daily samples, and then averaging the sample values over a second and longer interval, for example daily or monthly. In addition, within an HCI environment such as the environment illustrated in FIG. 1 and FIG. 2, additional data smoothing may be obtained by averaging UEI values across multiple nodes and/or multiple clusters of nodes.

In the context of a time series of UEI values, the exponential smoothing algorithm 700 illustrated in FIG. 7 predicts a next UEI value, i.e., a UEI value for the next time series interval, based upon a combination of the UEI value observed during the current time series interval and the UEI value predicted by the algorithm for the previous times series interval.

Because the algorithm 700 illustrated in FIG. 7 predicts the next value in a time series based, in part, upon a previously predicted value, an initial value (so) must be supplied to obtain the first predicted value. Moreover, because the initial value specified can meaningfully influence the resulting model, a training phase may be employed to obtain an appropriate value for $s_0$. In at least some embodiments, an appropriate value of $s_0$ may be calculated by taking the mean of a minimum number of UEI values. In other environments, the initial value S subscribe zero may be selected by a user.

As discussed previously, the single exponential smoothing formula includes a smoothing factor, $\alpha$, which is a value between zero and one. The selection of a value for the smoothing factor $\alpha$ impacts the accuracy of the model. Values of $\alpha$ close to one have less of a smoothing effect and give greater weight to recent changes in the data. In contrast, values of $\alpha$ closer to zero have a greater smoothing effect and result in predicted values that are less responsive to recent changes. In at least some embodiments, selection of an appropriate value for the smoothing factor $\alpha$ may be obtained by determining a standard deviation of the UEI time series data, wherein higher standard deviations suggest that a higher smoothing factor value is appropriate while lower standard deviation suggest a smoothing factor value closer to zero.

The method 600 illustrated in FIG. 6 includes a training phase (operation 602) during which UEI sample values are collected and provided to an exponential smoothing model employing an algorithm such as the algorithm 700 of FIG. 7 to identify a suitable value for use as the initial value ($s_0$) for an optimization phase described. During training phase 602, a comparatively large value of $\alpha$, e.g., $0.6<\alpha<0.9$, may be selected to quickly conform the model to the data. In at least some embodiments, the configuration of the DCPMM, value of $\alpha$ is not updated prior to any reboots that may occur, e.g., following server maintenance, training.

At the completion of the training phase, an optimization phase (operation 604) is performed. The last UEI value predicted by the model during training phase 602 may be used as the initial value for optimization phase 604. During optimization phase 604, collection of UEI sample data continues and a standard deviation may be calculated and used to adjust the value of $\alpha$, with larger standard deviations suggesting larger values of $\alpha$.

Following optimization phase 604, the illustrated method 600 then employs the optimized model, determined during optimization phase 604, to predict (operation 606) UEI values for the next time series interval. In some embodiments, time series intervals may be defined based on system reboot events, which may correlate with server maintenance events. In these embodiments, the UEI for the next interval may be predicted, using the optimized model, during server maintenance windows and the predicted UEI may be used to reconfigured the DCPMM.

The illustrated embodiment of method 600 includes an additional operation 608 in which one or more derived configurations are defined based upon the UEI-based configuration identified in operation 606. For example, some embodiments may define a memory-constrained configuration and a storage-constrained configuration derived from the targeted configuration. As discussed previously, in at least some embodiments, the memory constrained configurator May refer to a configuration in which the memory division is 50% of the memory division targeted allocation while the storage constrained configuration may refer to a configuration in which the storage allocation is 50% of the targeted allocation. After defining the three configurations, the UEI associated with each configuration may be calculated and the configuration resulting in the highest UEI may be selected for implementation in the DCPMM itself. The DCPMM become capacity division may be implemented, and at least some environments, through a BMC, UEFA bios set up, or an operating system DCPMM application/driver.

Figure 8:
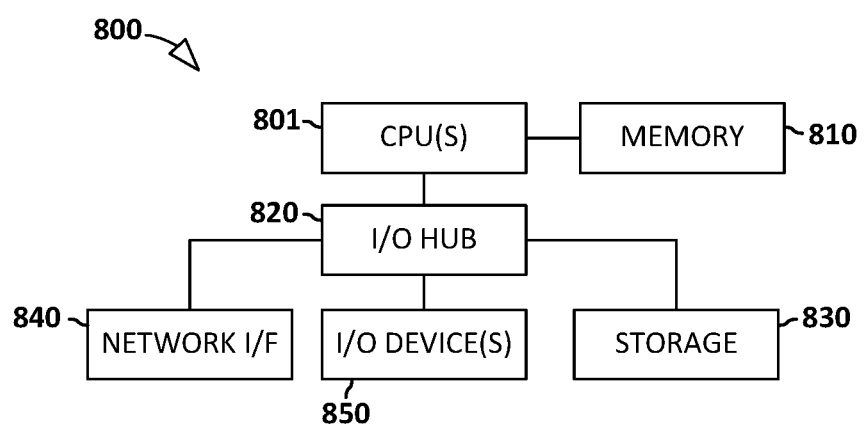
FIG. 8 illustrates a block diagram of an exemplary information handling system.

Any or all of the HCI components illustrated or described herein, including virtualized components and resources, may be instantiated on an information handling system 800 illustrated in FIG. 8. The illustrated information handling system include one or more general purpose processors or central processing units (CPUs) 801 communicatively coupled to a volatile memory resource 810 and to an input/output hub 820 to which various I/O resources and/or components are communicatively coupled. The I/O resources explicitly depicted in FIG. 8 include a network interface 840, commonly referred to as a NIC (network interface card), storage resources 830, and additional I/O devices, components, or resources including as non-limiting examples, keyboards, mice, displays, printers, speakers, microphones, etc. All not explicitly depicted in the FIG. 8, some embodiments of information handling system 800, including some server embodiments, may include a baseboard management controller providing, among other features and services, an out-of-band management resource which may be coupled to a management device. Similarly, although not explicitly depicted in FIG. 8, at least some notebook, laptop, and/or tablet embodiments of information handling system 800 may include an embedded controller (EC) providing some management functions that may include at least some functions, features, or services provided by the baseboard management controller in some server embodiments.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
one or more central processing units (CPUs); and
storage resources communicatively coupled to the one or more CPUs, wherein the storage resources include a hybrid storage resource, wherein the hybrid storage resource is user-configurable to allocate a first portion of its capacity as a volatile memory resource and a second portion of its capacity as a persistent storage resource and wherein the storage resources include CPU-executable program instructions, that, when executed by the one or more CPUs cause the information handling system to perform memory management operations, wherein the memory management operations include:
assessing a utilization efficiency index (UEI) of the hybrid storage resource, wherein the UEI is determined, at least in part, based on a combination of a utilization of the volatile memory resource and a utilization of the persistent storage resource;
determining a target memory-storage configuration based on the UEI; and
configuring the hybrid storage resource to provide a first portion of its capacity as the volatile memory resource and a remaining portion of its capacity as the persistent storage resource, wherein the first portion is determined in accordance with the target memory-storage configuration;
wherein assessing the UEI includes obtaining times series samples of memory utilization and storage utilization and calculating the UEI for each sample based, at least in part, on the memory utilization and the storage utilization, wherein calculating the UEI includes accessing a memory weighting factor and a storage weighting factor, wherein the memory weighting factor and the storage weighting factor reflect a comparative prioritization between memory utilization and storage utilization; and
the UEI is determined based, at least in part, on the memory weighting factor and the storage weighting factor.

2. The information handling system of claim 1, wherein the UEI is defined by $$\text{Index}_{ue} = \frac{[(1 - U_m) * W_{Um}] + [(1 - U_s) * W_{Us}]}{W_{Um} + W_{Us}}$$

wherein $\text{Index}_{ue}$ is the UEI, $U$ is the memory utilization, $U_s$ is the storage utilization, and $W_{Um}$ is the memory weighting factor and $W_{Us}$ is the storage weighting factor.

3. The information handling system of claim 1, wherein the information handling system is implemented as a single tenant system or on-premises system and wherein determining the target memory-storage configuration comprises identifying one or more system profiles, determining and assigning a static memory-storage division based at least in part on a UEI determined for each profile and wherein each of the target memory-storage configurations is associated with a corresponding profile parameter, wherein the profile parameter is selected from a profile parameter group comprising: a time/day parameter and an application parameter.

4. The information handling system of claim 1, wherein:
the information handling system comprises a multi-tenant cloud deployment;
assessing the UEI comprises predicting a UEI for a next time series interval based on an exponential smoothing model; and
assessing the UEI includes generating a smoothed time series of UEI values by collecting instantaneous memory utilization and storage utilization samples at a first frequency and calculating, at a second frequency that is lower than the first frequency, mean values for the instantaneous memory utilization and storage utilization samples.

5. The information handling system of claim 4, wherein the information handling system includes a hyper-converged infrastructure comprising one or more resource clusters each of which includes one or more resource nodes and wherein collecting instantaneous memory utilization and storage utilization samples comprises at least one of:
collecting instantaneous samples across two or more nodes in a particular cluster; and
collecting instantaneous samples across two or more of the resource clusters.

6. The information handling system of claim 4, wherein the exponential smoothing model comprises a single exponential smoothing model of a form:

$$S_{t+1} = \alpha y_t + (1-\alpha) S_{t-1}$$

wherein $S_{t+1}$ comprises a predicted UEI for a next time series interval, $y_t$ comprises an observed UEI for a current time series interval, $S_{t-1}$ comprises a previously predicted UEI for a previous time series interval, and a comprises a smoothing factor.

7. The information handling system of claim 6, further comprising classifying the smoothed time series of UEI values into one of a plurality of types selected from a group of types comprising: a stable and flat time series, wherein an initial value of a is within a first range, a long-term up or down time series, wherein an initial value of a is within a second range, and a short term up and down pattern, wherein an initial value of a is in a third range, wherein values in the third range exceed values in the second range and wherein values in the second range exceed values in the first range.

8. The information handling system of claim 6, further comprising determining a standard deviation of UEI values and adjusting a in accordance with a magnitude of the standard deviation.

9. The information handling system of claim 6, wherein predicting the UEI includes:
 training the exponential smoothing model based on UEI sample values using larger value of the smoothing factor (a);
 optimizing the exponential smoothing model, wherein optimizing the exponential smoothing model includes determining a standard deviation of UEI values predicted by the exponential smoothing model and adjusting the smoothing factor for the exponential smoothing model in accordance with the smoothing factor;
 prior to a reboot event, predicting a UEI for a next time series interval; and
 configuring the hybrid storage resource in accordance with the UEI predicted for the next time series interval.

10. A memory management method comprising:
 assessing a utilization efficiency index (UEI) of a hybrid storage resource, wherein the hybrid storage resource is user-configurable to allocate a first portion of its capacity as a volatile memory resource and a second portion of its capacity as a persistent storage resource, wherein the UEI is determined, at least in part, by a combination of a utilization of the volatile memory resource and a utilization of the persistent storage resource;
 determining a target memory storage configuration division based on the UEI assessment; and
 configuring the hybrid storage resource to allocate a first portion of its capacity to the volatile memory resource and a remaining portion of its capacity to the persistent storage resource, wherein the first portion is determined in accordance with the target memory-storage configuration division, wherein:
 assessing the UEI includes obtaining times series samples of memory utilization and storage utilization and calculating the UEI for each sample based, at least in part, on the memory utilization and the storage utilization;
 calculating the UEI includes accessing a memory weighting factor and a storage weighting factor, wherein the memory weighting factor and the storage weighting factor reflect a comparative prioritization between memory utilization and storage utilization; and
 the UEI is determined based, at least in part, on the memory weighting factor and the storage weighting factor.

11. The method of claim 10, wherein the UEI is defined by $$Index_{ue} = \frac{[(1-U_m)*W_{Um}]+[(1-U_s)*W_{Us}]}{W_{Um}+W_{Us}}$$

wherein $Index_{ue}$ is the UEI, Um is the memory utilization, $U_s$ is the storage utilization, and $W_{Um}$ is the memory weighting factor and $W_{Us}$ is the storage weighting factor.

12. The method of claim 10, wherein the information handling system is implemented as a single tenant system or on-premises system and wherein determining the target memory-storage configuration division comprises identifying one or more system profiles, determining and assigning a static memory storage configuration ratio based at least in part on a UEI determined for each profile and wherein each of the target memory-storage configurations is associated with a corresponding profile parameter, wherein the profile parameter is selected from a profile parameter group comprising: a time/day parameter and an application parameter.

13. The method of claim 10, wherein the information handling system comprises a multi-tenant cloud deployment and wherein assessing the UEI comprises predicting a UEI for a next time series interval with an exponential smoothing algorithm and wherein assessing the UEI includes generating a smoothed time series of UEI values by collecting instantaneous memory utilization and storage utilization samples at a first frequency to calculate means values corresponding to a second frequency.

14. The method of claim 13, wherein the information handling system includes a hyper-converged infrastructure comprising one or more resource clusters each of which includes one or more resource nodes and wherein collecting instantaneous memory utilization and storage utilization samples comprises at least one of:
 collecting instantaneous samples across two or more nodes in a particular cluster; and
 collecting instantaneous samples across two or more of the resource clusters.

15. The method of claim 13, wherein the exponential smoothing algorithm comprises a single exponential smoothing wherein:

$$S_{t+1}=\alpha y_t+(1-\alpha)S_{t-1}$$

wherein $S_{t+1}$ comprises a predicted UEI for a next time series interval, $y_t$ comprises an observed UEI for a current time series interval, $S_{t-1}$ comprises a previously predicted UEI for a previous time series interval, and a comprises a smoothing factor.

16. The method of claim 15, further comprising classifying the smoothed time series of UEI values into one of a plurality of types selected from a group of types comprising: a stable and flat time series, wherein an initial value of a is within a first range, a long-term up or down time series, wherein an initial value of a is within a second range, and a short term up and down pattern, wherein an initial value of a is in a third range, wherein the values in the third range exceed the values in the second range and wherein the values in the second range exceeds the values in the first range.

17. The method of claim 15, further comprising determining a standard deviation of UEI values and adjusting a in accordance with a magnitude of the standard deviation.

18. The method of claim 17, wherein predicting the UEI includes:
 training the exponential smoothing model based on UEI sample values using larger value of the smoothing factor (a);
 optimizing the exponential smoothing model, wherein optimizing the exponential smoothing model includes determining a standard deviation of UEI values predicted by the exponential smoothing model and adjusting the smoothing factor for the exponential smoothing model in accordance with the smoothing factor;
 prior to a reboot event, predicting a UEI for a next time series interval; and
 configuring the hybrid storage resource in accordance with the UEI predicted for the next time series interval.

* * * * *